US007592997B2

(12) United States Patent
Evers-Senne et al.

(10) Patent No.: US 7,592,997 B2
(45) Date of Patent: Sep. 22, 2009

(54) SYSTEM AND METHOD FOR DETERMINING A POSITION, IN PARTICULAR FOR AUGMENTED REALITY APPLICATIONS

(75) Inventors: Jan-Friso Evers-Senne, Altenholz (DE); Jan-Michael Frahm, Kiel (DE); Mehdi Hamadou, Erlangen (DE); Dirk Jahn, Erlangen (DE); Peter Georg Meier, München (DE); Juri Platonov, München (DE); Didier Stricker, Weinhelm (DE); Jens Weidenhausen, Worms (DE)

(73) Assignee: Siemens Aktiengesellschaft, Munich (DE)

( * ) Notice: Subject to any disclaimer, the term of this patent is extended or adjusted under 35 U.S.C. 154(b) by 713 days.

(21) Appl. No.: 11/142,718

(22) Filed: Jun. 1, 2005

(65) Prior Publication Data
US 2005/0275722 A1 Dec. 15, 2005

(30) Foreign Application Priority Data
Jun. 3, 2004 (DE) ............... 10 2004 027 270

(51) Int. Cl.
*G09G 5/00* (2006.01)
(52) U.S. Cl. ............... 345/156; 345/158; 345/207; 345/212; 345/213
(58) Field of Classification Search ......... 345/156–169, 345/173–178
See application file for complete search history.

(56) References Cited

U.S. PATENT DOCUMENTS 6,148,280 A 11/2000 Kramer

| 6,535,282 B2 * | 3/2003 | Hedges et al. | 356/141.3 |
| 6,630,993 B1 * | 10/2003 | Hedges et al. | 356/141.4 |
| 2002/0154294 A1 * | 10/2002 | Hedges et al. | 356/141.4 |

OTHER PUBLICATIONS

Reitmayr G. et al, "OpenTracker—An Open Software Architecture for Reconfigurable Tracking based on XML", Technical Report TR-186-2-00-18, [Online], Sep. 2000, pp. 1-5, XP002467968, Vienna University of Technology, Internet: URL:http://www.cg.tuwien.ac.at/research/publications/2000/Schm-2000-Bri/TR-184-2-00-18Paper.pdf> found am Feb. 6, 2008.

Satoh K et al, "A hybrid registration method for outdoor augmented reality" Augmented Reality, 2001, Proceedings, IEEE and ACM International Symposium on New York, NY, USA, Oct. 29-30, 2001, Los Alamitos, CA, USA, IEEE Comput. Soc, US, 29. Oct. 2001, pp. 67-76, XP010568049, ISBN: 0-7695-1375-1, p. 3,left-hand column, line 1—p. 5, right column, line 34, p. 8, left-hand column, lines10,11, pp. 68-69, paragraph 3. "Goal and our approach".

(Continued)

*Primary Examiner*—Vijay Shankar

(57) ABSTRACT

The invention relates to a system for determining the position of a user and/or a moving device by means of tracking methods, in particular for augmented reality applications, with an interface (9) to integrate at least one sensor type and/or data generator (1, 2, 3, 4) of a tracking method, a configuration unit (20) to describe communication between the tracking methods and/or tracking algorithms and at least one processing unit (5, 6, 7, 8, 10, 11, 12, 13, 16) to calculate the position of the user and/or the moving device based on the data supplied by the tracking methods and/or tracking algorithms.

19 Claims, 1 Drawing Sheet

OTHER PUBLICATIONS

Bolan Jiang et al, "A Robust Hybrid Tracking system for Outdoor Augmented Reality", Proceedings of the 2004 IEEE Virtual Reality, Mar. 27-31, 2004, Chicago, IL USA, pp. 3-10, 275, XP010769450, ISBN: 0-7803-8415-6.

Newman J et al, "Fundamentals of Ubiquitous Tracking for Augmented Reality" Technical Report TR-188-2-2003-34, [Online] 2003, pp. 1-18, XP002467969 Vienna University of Technology, Internet: URL://www.ims.tuwien.ac.at/media/documents/publications/ubitrack.pdf [found Feb. 6, 2008] pp. 2, last paragraph, pp. 8-10, paragraph "3 Model Parameters".

Miguel Ribo, Axel Pinz and Anton L. Fuhrmann, "A new Optical Tracking System for Virtual and Augmented Reality Applications", IEEE Instrumentation and Measurement, Technology Conference, Budapest, Hungary, May 21-23, 2001, pp. 1-5.

* cited by examiner

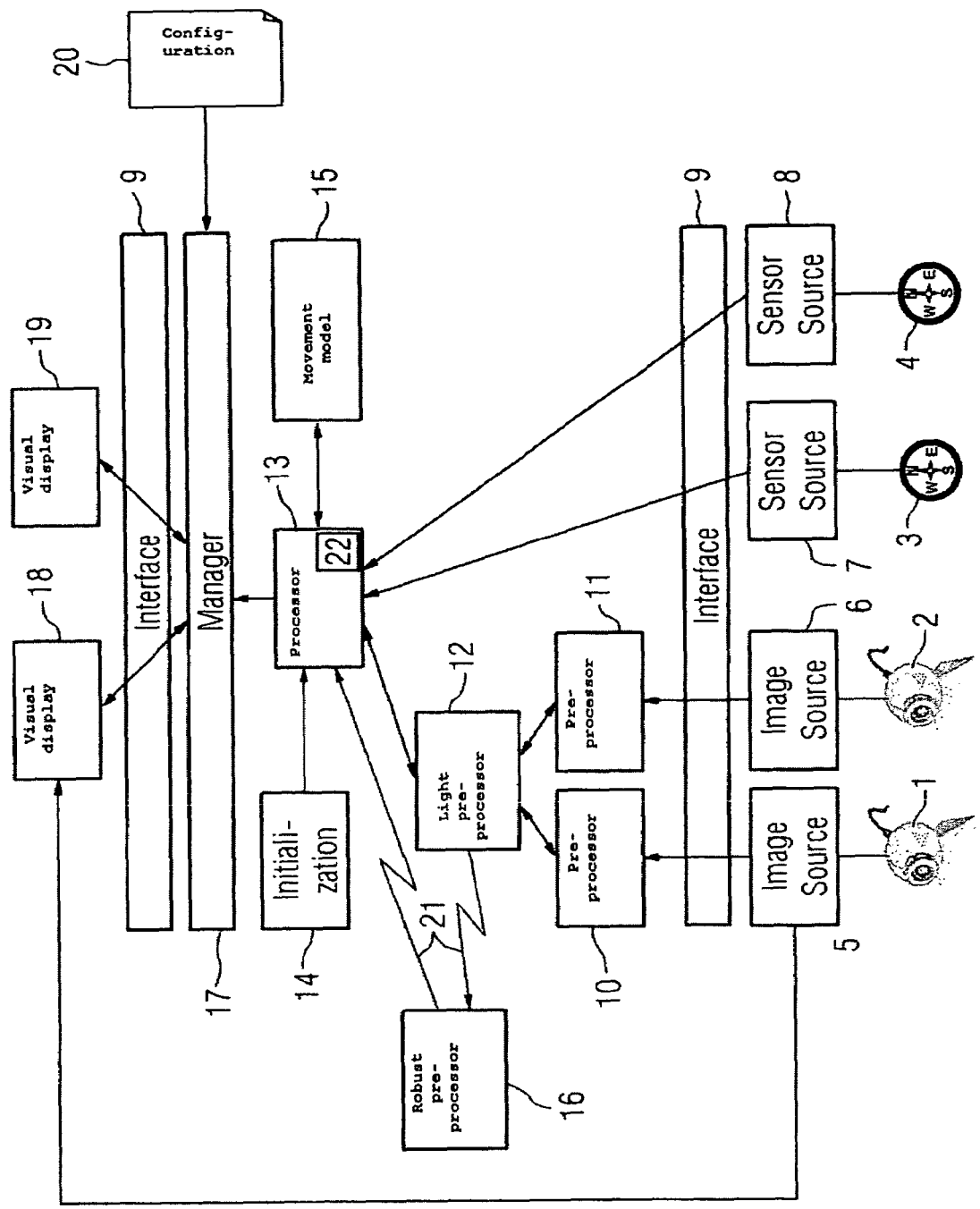

SYSTEM AND METHOD FOR DETERMINING A POSITION, IN PARTICULAR FOR AUGMENTED REALITY APPLICATIONS

CROSS REFERENCE TO RELATED APPLICATIONS

This application claims priority to the German application No. 10 2004 027 270.0, filed Jun. 3, 2004 and which is incorporated by reference herein in its entirety.

FIELD OF INVENTION

The invention relates to a system and a method for determining the position of a user and/or a moving device by means of tracking methods, in particular for augmented reality applications.

SUMMARY OF THE INVENTION

Augmented reality is a form of man-machine interaction, which superimposes information on the person's visual field by means of data glasses; thereby augmenting the reality perceived by said person. Tracking methods are used to achieve such virtual augmentation of the real visual field with positional accuracy. These can comprise both hardware and software. They include optical, inertial, acoustic, magnetic, etc. methods. The individual methods are thereby based on different algorithms, all of which provide more or less accurate information about the position of the user.

To determine the position of the user and their viewing direction, superimposition has to have positional accuracy. Individual tracking methods have their own advantages and disadvantages. An optical method for example requires no additional instrumentation but does require a high level of computing power, which cannot at present be provided by an industry-standard mobile system. Inertial systems have very good realtime capability but such methods can only capture relative movement of the user. Magnetic methods are sensitive to magnetic fields so such methods are subject to interference in industrial environments due to the machines and electrical drive units there. Similarly the noise situation means that acoustic methods are of only limited use in a production plant.

The different methods have almost always only been looked at in isolation until now. There have been some initial approaches to combining said methods (e.g. inertial and acoustic). These approaches are however not suitable for industrial, medical or consumer applications given the complex local instrumentation required.

Current systems are primarily based on one method. Purely video-based methods generally operate with local instrumentation, which is not suitable for industrial applications, as the environment has to be equipped with markers. These markers are subject to environmental influences in an industrial environment so that they become dirty and are then no longer identified by the system. Also local instrumentation is associated with a high time outlay, so that the effectiveness of such a system is no longer acceptable. There are also approaches relating to optical methods, which do not require instrumentation. However no method is known, which can provide the realtime capability required for an industrial application on a mobile system.

There are combinations of methods at the research stage but these do not claim realtime capability. However this is essential for industrial use. It must also be taken into account during use in the various fields of application that portable systems are used, which only provide a limited computing power. There is currently no known approach relating to such a system. It should also be taken into account that the different methods provide results with different frequencies. This must be taken into account when merging the individual results.

The object of the present invention is therefore to specify a system and a method, which allow the simple combination and application of the different tracking methods to determine position.

The object is achieved by the claims.

The invention is based on the knowledge that combining the results of the methods improves the overall result.

Defining a universal system, referred to below as the framework, for the methods for determining position (tracking framework) ensures that the individual methods can be interchanged or supplemented. This has the advantage that new or improved methods can be integrated quickly into an application via the system or framework. By defining interfaces it is also possible to integrate methods developed by third parties. This ensures the greatest possible openness.

Because of the very different applications and their associated requirements (site of use, conditions of use, environmental conditions, etc.), different approaches are required with the tracking methods. For applications in the automotive industry, the work area is for example the engine area of an automobile. This is very different from aircraft applications where, for example in the case of the undercarriage, no limits are imposed on the work area by the body of the aircraft. The automation application can for example not refer back to existing 3-D models, as these are generally not available in this field of application. Other fields of application have even more different basic conditions.

In order to comply with these requirements, according to the invention a system or framework is provided, which allows the methods to be exchanged or adapted. A clearly defined framework also allows new, improved methods to be included in said framework quickly, thereby improving the compatibility of the overall system in the relevant field of application.

A universal tracking framework plays a supportive role in the provision of industrial tracking methods or their associated applications, as said framework makes it possible to integrate different tracking systems/methods into the system. It is therefore possible to respond quickly to modified basic conditions within the applications and to select the system that is appropriate to and optimized for the application in question.

So that the different types of tracking method can work together, the various sensors have to be connected to the system. Organization into fast and robust tracking elements allows realtime compatibility of the overall system to be achieved taking into account available resources (e.g. of a portable computer).

The tracking framework uses a configuration description to set up communication between the required tracking method and algorithms for the runtime. The data flow of this communication is automatically time-stamped by the tracking framework, to ensure synchronicity during data processing. The flexibility of these basic mechanisms ensures the openness of the framework in respect of future improved or extended tracking methods.

It is particularly advantageous that a framework is provided for position determination in industrial environments. This framework complies with the requirements of the industry, medicine, consumer, etc. fields of application, in that the methods are based on an overall system concept. The framework offers the option of integrating different sensors into the system in a neutral fashion, thereby creating an openness for subsequent modifications and extensions. The methods are integrated using defined interfaces, so that an exchange of information is enabled between processing units from different suppliers within the framework.

Sensors and visual display units can access the framework or supply information via a neutral interface. The interface can be used to integrate sensors which are not as yet known. Configurability by means of a simple description (e.g. XML file) is a novel method of setting up the data flow between the individual methods. Synchronization of data by the framework represents a simplification of the structure of such methods compared with current technologies. This framework therefore complies with the requirements of both current and future applications.

The interface also allows different visual display units to be used, which are for example optimized for a specific application. The framework therefore for example allows a purely visual position determination method to be set up based on markers. However combined methods have to be used for industrial applications. The openness of the framework ensures that complex combinations of different methods can be set up.

Different approaches to augmented reality can also be enabled. These include on the one hand a video-see-through display, with which the user can perceive their environment by means of a superimposed video. However this is only of limited use for industrial applications, so the framework can also be used for optical see-through approaches, with which only the additional virtual objects are superimposed in the correct position based on position determination.

The invention is explained and described in more detail below with reference to an exemplary embodiment shown in the sole FIGURE.

BRIEF DESCRIPTION OF THE DRAWING

The sole FIGURE shows an embodiment of the invention.

DETAILED DESCRIPTION OF THE INVENTION

FIG. 1 shows the system, hereinafter referred to as the framework. The environment is perceived via the sensors 1, 2, 3, 4. A plurality of video cameras 1, 2 can be used, which observe the work area or the environment. Further sensors 3, 4 can be integrated to improve the stability of the overall system. These can be inertial sensors for example or even sensors based on other methods.

The sensors are linked to the system via sensor-specific processing units (sources) 5, 6, 7, 8. These sensor-specific processing units effect the method-specific conversion and the extension of the sensor information required for synchronization. These sources 5, 6, 7, 8 are used to achieve sensor-neutral integration via the framework interface 9, so that further and possibly as yet unknown sensors can also be integrated at a later stage.

The video-based data is used to define features from the images. The features (e.g. points, lines, color values, etc.) are then tracked from image to image and the respective displacements calculated therefrom. The displacements mirror the movement of the user. This takes place in the respective preprocessing units 10, 11. These units are specifically optimized for the rapid execution required for mobile systems with limited computing power.

In the direct processing unit (light preprocessing) 12 a user position is calculated on the basis of the results from the preprocessor 10, 11 and the precise position supplied by the central processing unit 13. Light preprocessing must thereby also comply with realtime requirements. In the indirect processing unit 16 during robust preprocessing algorithms are used, which prevent error accumulation, e.g. drifts, and can therefore ensure long-term stability. These methods consume more power than the other methods.

Should the power of the processing system not suffice, this unit can be transferred out. This can be done via a radio connection 21 for example.

All the results of the individual processing steps 7, 8, 10, 11, 16 are merged in the central processing unit 13. Calculations are used here to evaluate the reliability of the results to provide the most accurate information possible about the current position of the user. An optional human movement model 15 can also be used to improve the calculation result further. The result from the central processing unit 13 can be supplied to every module as a basis for calculation. The light preprocessing modules 12 and the movement model 15 require this data in order to be able to carry out further, new calculations. The result from the central processor 13 is also supplied to a manager 17.

Processing must be initialized at the start. Initialization 14 supplies the precise position of the user. Should the reliability of position calculation in the central processor 13 deteriorate, further initialization (reinitialization) is prompted. This once again supplies the precise position of the user. No user interaction is required during (re)initialization.

The manager 17 manages the result of the position calculation of the framework. The results are supplied to the visual display 18, 19, which displays the virtual objects in the visual field of the user based on user position. This takes place via a neutral interface 9, so that different visual displays can be operated. User-specific superimposition can only be achieved on the basis of a precise position.

A configuration 20 is also read at the start. The configuration contains the modules required for position determination and the information streams to be exchanged between the modules. The configuration can therefore be used to set up the framework and tailor it to the application. It is also possible to transfer parameter sets from the visual displays 18, 19 via the manager 17 to the processing units. The parameter sets contain the situation-related configurations for position determination, which can vary over an application.

FIG. 1 shows an overview of the framework for determining the position of a user. This FIGURE shows a system with a plurality of video-based sensors and a plurality of further sensors. The information from the sensors is processed and used to calculate the position of the user. Position is thereby determined, as described above, in different processing steps, to ensure the necessary realtime capability of the system.

The system or framework can be used to determine both the position of a human user and the position and direction of movement of a moving device, e.g. a robot. The processing results of the different tracking methods are then supplied correspondingly to the device in machine-readable form.

One scenario for the possible use of the system/framework is as follows:

An application developer for example determines which sensors 1, 2, 3, 4 and which processing units 10, 11, 12, 13, 14, 15, 16 are to be used for an application. This information is used to establish a configuration 20, which links the sensors to the system and interleaves the algorithms. This configuration is made known to the system.

Starting the framework or manager 17 allows the configuration to be read in and the position determination system to be set up according to the configuration. The individual processing units 10, 11, 12, 13, 14, 15, 16 are interleaved so that the sensor data can be processed.

A visual display 18 or 19 is started and the visual display establishes a connection to the manager 17 via the interface 9.

The position of the user can be determined at the start by means of initialization 14. A marker-based method for example can be used here. Other methods are however also possible.

Once the initial position of the user is known, it is made known to the processing units.

The interfaces of the sensors 5, 6, 7, 8 then supply their data, including synchronization data, via the interface 9 to the processing units.

Features (e.g. points, lines, etc.) are extracted from the video-based data 5, 6 in the preprocessor 10, 11 and are then tracked further. The position change can be calculated when the user moves and therefore the identified features move within the image.

These position changes are forwarded to the light preprocessor 12. A new position is reliably calculated from the former position and the position change. The input data of the light preprocessor is forwarded to an optional robust processing unit 16.

In contrast to the previous preprocessing unit 12, the robust preprocessing unit 16 has a significantly larger search area, so that position can be determined more reliably.

If the user moves quickly, it is possible that the units under 7 and 8 may not be able to supply reliable values, as the displacements are too large. This is compensated for by the further sensors 3, 4, as these can supply their information with a significantly greater frequency.

The various position calculations and their reliability are analyzed in the central processor 13. Should a sensor temporarily not be able to supply reliable positions, more reliable sensors are assigned higher values.

Should the central processor 13 no longer be able to supply a position, reinitialization 14 is prompted automatically, so that the system once again knows the precise position of the user. Where possible such reinitialization takes place without user interaction.

The manager 17 receives the current user position from the processor 13.

The visual display 18 or 19 requests the current position of the user from the manager 17 via the interface 9. Superimposition of the real visual field with virtual information is achieved based on this position.

The invention comprises further advantageous embodiments regarding a method:

Sensor-neutral integration of the data supplied by the sensors and/or data generators (1, 2, 3, 4) in the interface (9) is effected by sensor-type-specific processing units (5, 6, 7, 8).

The movement of the user and/or the moving device is calculated on the basis of video-based data obtained by tracking the displacement of features in successive images.

The position and/or an angle of vision of the user and/or the direction of movement of the moving device is supplied by an initialization unit (14) when the system is first used.

The system is reinitialized and/or calibrated by the initialization unit (14) when the reliability of the position determination and/or the angle of vision and/or the direction of movement deteriorate(s).

The position and/or the angle of vision of the user and/or the direction of movement of the moving device is/are calculated by a direct processing unit (12) based on the results from the preprocessing units (10, 11) and/or the position supplied by a central processing unit (13).

The position and/or the angle of vision of the user and/or the direction of movement of the moving device is/are calculated by an indirect processing unit (16) based on error-prevention algorithms.

The individual processing steps of the processing units (7, 8, 10, 11, 16) are merged by a central processing unit (13), with the reliability of the results being calculated.

The data is transmitted between the central processing unit (13) and/or the direct processing unit (12) and the indirect processing unit (16) by means of a radio connection (21).

The calculation result is improved using a movement model (15) for the human and/or the moving device.

The calculated results from the central processing unit (13) are received by a manager (17), with the manager (17) managing the results of the position and/or angle of vision and/or direction of movement calculation(s).

Virtual objects are displayed in the field of vision of a user by means of at least one visual display device (18, 19), with the results of the position and/or angle of vision calculation(s) being supplied by the manager (17) for the at least one visual display device.

The invention claimed is:

1. A method for determining a position of a user and a position of a moving device for augmented reality applications, the method comprising:

using a tracking method and at least one different tracking method, or at least one tracking method and at least one movement model, simultaneously, to determine the position or positions;

integrating data from the tracking method and at least one different tracking method, or from the at least one tracking method and at least one movement model via an interface;

interacting between the tracking method and at least one different tracking method, or the at least one tracking method and at least one movement model by a configuration unit; and calculating the position of the user and the moving device by at least one processing unit based on data provided by the tracking method and at least one different tracking method, or the at least one tracking method and at least one movement model.

2. The method according to claim 1, wherein a data flow of the interaction between the tracking methods and/or movement models is synchronized by time stamps.

3. The method according to claim 1, wherein an angle of vision of the user and the direction of movement of the moving device is calculated based on the data provided by the tracking methods and/or movement models.

4. A system for determining a position of a user and a moving device by using tracking methods and/or movement models, the system comprising:

a tracking method and at least one different tracking method, or at least one tracking method and at least one movement model, operating simultaneously;

an interface configured to integrate tracking method data;

a configuration unit configured to describe a communication between the tracking methods and/or movement models; and at least one processing unit configured to calculate the position of the user and the moving device based on data supplied by the tracking methods and/or movement models.

5. The system according to claim 4, wherein the system is used for augmented reality applications.

6. The system according to claim 4, further comprising a mechanism configured to synchronize a data flow of the communication between the tracking methods and/or movement models.

7. The system according to claim 6, wherein the mechanism synchronizes data flow using time stamps.

8. The system according to claim 4, wherein the at least one processing unit is provided to calculate an angle of vision of the user and a direction of movement of the moving device based on the data supplied by the tracking methods and/or movement models.

9. The system according to claim 4, further comprising sensor-type-specific processing units configured to provide appropriate data to enable method and movement model neutral integration of the data supplied by the sensors and/or data givers in the interface.

10. The system according to claim 4, further comprising preprocessing units to calculate the movement of the user and the moving device, based on video-based data, wherein the calculation is based on a tracking of a displacement of features in successive images.

11. The system according to claim 4, further comprising an initialization unit to provide the position and an angle of vision of the user and a direction of movement of the moving device when the system is first used.

12. The system according to claim 4, further comprising an initialization unit to reinitialize and/or calibrate the system, when the reliability of the position calculation or the reliability of an angle of vision or the reliability of a direction of movement deteriorates.

13. The system according to claim 4, further comprising a direct processing to calculate the position and an angle of vision of the user and a direction of movement of the moving device, wherein the calculation is based on results provided by a preprocessing unit and/or the calculation is based on the position provided by a central processing unit.

14. The system according to claim 4, further comprising an indirect processing unit to calculate the position and an angle of vision of the user and a direction of movement of the moving device, wherein the calculation is based on error-prevention algorithms.

15. The system according to claim 4, wherein a central processing unit is provided to merge the individual processing steps of the processing units, wherein mechanisms are provided to calculate the reliability of the results.

16. The system according to claim 4, wherein a radio connection is provided to transmit data between the processing units.

17. The system according to claim 16, wherein the radio connection is provided to transmit data between a central processing unit and an indirect processing unit, and between a direct processing unit and an indirect processing unit.

18. The system according to claim 4, further comprising a manager to receive the calculated results from a central processing unit, wherein the manager is provided to manage the results of the position and an angle of vision and a direction of movement calculation(s).

19. The system according to claim 4, further comprising
at least one visualization device to display virtual objects in the visual field of the user; and
a manager configured to provide the results of the position and an angle of vision calculation(s) for the at least one visualization device.

* * * * *